United States Patent

Lundbäck

[11] Patent Number: 6,015,501
[45] Date of Patent: Jan. 18, 2000

[54] METHOD AND APPARATUS FOR SKIMMING A FLOATABLE SURFACE LAYER FROM A WATER SURFACE

[75] Inventor: Stig Lundbäck, Vaxholm, Sweden

[73] Assignee: Humanteknik AB, Stockholm, Sweden

[21] Appl. No.: 09/011,635

[22] PCT Filed: Aug. 14, 1996

[86] PCT No.: PCT/SE96/01014

§ 371 Date: Feb. 13, 1998

§ 102(e) Date: Feb. 13, 1998

[87] PCT Pub. No.: WO97/07292

PCT Pub. Date: Feb. 27, 1997

[30] Foreign Application Priority Data

Aug. 14, 1995 [SE] Sweden .................................. 9502826
Oct. 10, 1995 [SE] Sweden .................................. 9503520
Oct. 16, 1995 [SE] Sweden .................................. 9503612

[51] Int. Cl.$^7$ .................................................. E02B 15/04
[52] U.S. Cl. ........................ 210/776; 210/242.3; 210/923
[58] Field of Search .................... 210/776, 242.3, 210/923

[56] References Cited

U.S. PATENT DOCUMENTS

| | | |
|---|---|---|
| 3,741,391 | 6/1973 | Donsbach . |
| 3,853,768 | 12/1974 | Bagnulo . |
| 4,356,086 | 10/1982 | Oberg .................................. 210/242.3 |
| 5,308,510 | 5/1994 | Gore ........................................ 210/923 |

*Primary Examiner*—Robert J. Popovics
*Attorney, Agent, or Firm*—Hill & Simpson

[57] ABSTRACT

In a method for recovering a floatable surface layer from a body of water, particularly a surface layer comprising a buoyant pollutant, such as oil, a collection compartment (A) having a skiming weir (K) at its top is provided in the body of water and filled with water. With the skimming weir held in an overflow position relative to the surface of the body of water, water is discharged from the collection compartment (A) so that the collection compartment can be replenished from the surface of the body of water with water flowing over the skimming weir (K). Apparatus for carrying out the recovery comprises a collection vessel (11, 31). which is immersible in a body of water and defines the collection compartment (A) and which has a skimming weir (K) which forms an inlet into the upper end of the collection compartment (A), and means (17, 18, 35, 36), such as a reversible pump, for discharging water from the collection compartment.

24 Claims, 5 Drawing Sheets

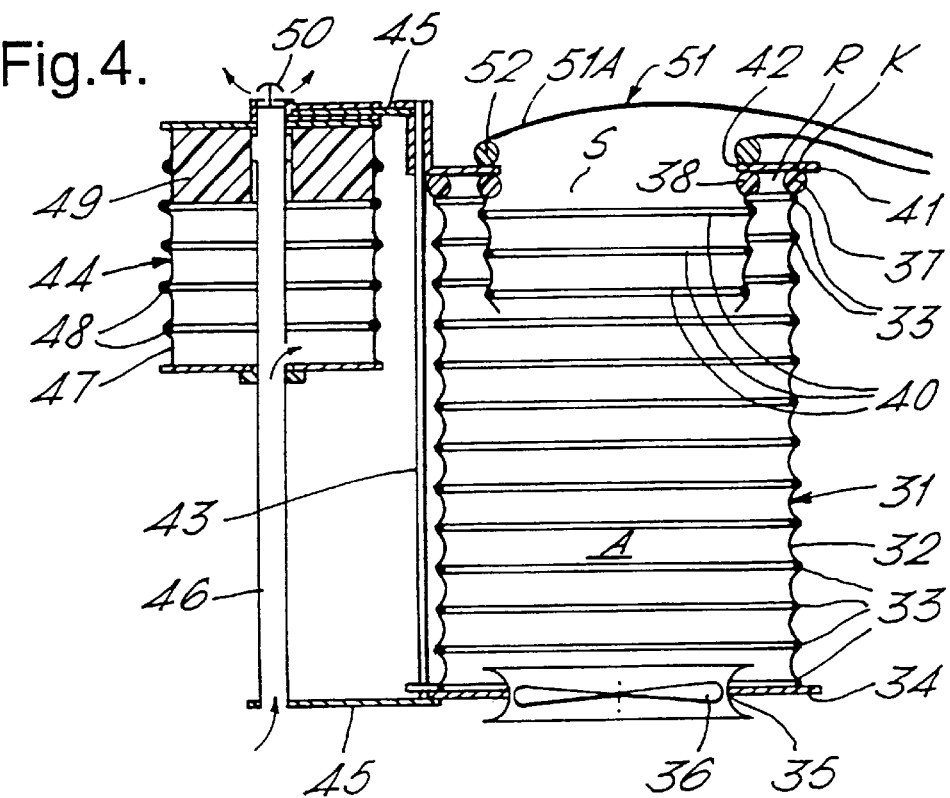
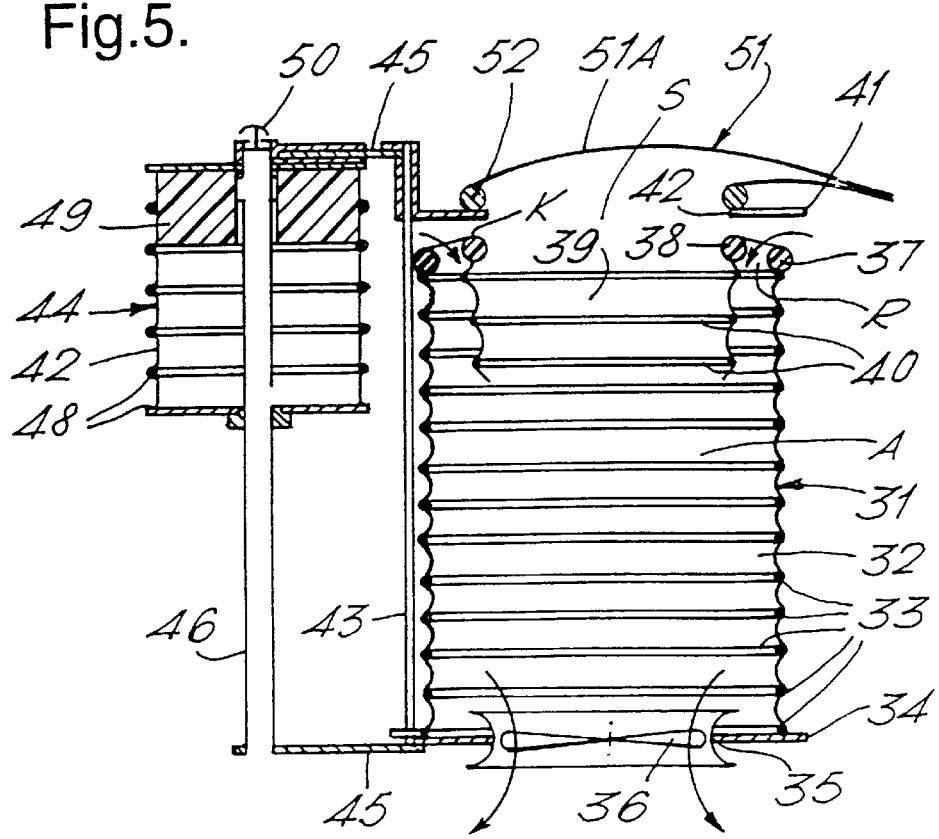

METHOD AND APPARATUS FOR SKIMMING A FLOATABLE SURFACE LAYER FROM A WATER SURFACE

BACKGROUND OF THE INVENTION

This invention relates to a method and apparatus for skimming a surface layer from a body of water, such as for recovering oil floating on the water. The invention will be described with particular reference to the last-mentioned application but it is also useful for recovering materials other than oil.

BRIEF SUMMARY OF THE INVENTION

More particularly, the invention is concerned with a technique which comprises providing in the body of water a submerged collection compartment having an inflow opening defined by a skimming weir the crest of which is located at the water surface. The skimming weir is caused to take an overflow position relative to the water surface and at the same time water is discharged from the lower portion of the collection compartment. Oil and water flowing over the skimming weir replenishes the collection compartment at the top thereof. The inflow of oil is controlled by controlling the position of the skimming weir relative to the water surface and by controlling the discharge of water from the lower portion of the collection compartment.

In the collection compartment the oil, by virtue of its lower density relative to the water, forms a layer of oil on top of the underlying water.

The oil collected in the collection compartment may be removed in different ways. For example, it may be intermittently or continuously pumped to a suitable larger storage vessel or container.

The primary object of the invention is to provide an improved method and apparatus for accomplishing the above-described technique.

BRIEF DESCRIPTION OF THE DRAWINGS

The features of the invention are illustrated in the accompanying diagrammatic drawings and will be described below with reference to the figures of the drawings.

FIGS. 4 to 7 show a preferred embodiment of the skimmer apparatus according to the invention.

DETAILED DESCRIPTION OF THE PRESENTLY PREFERRED EMBODIMENTS

Figure 1:
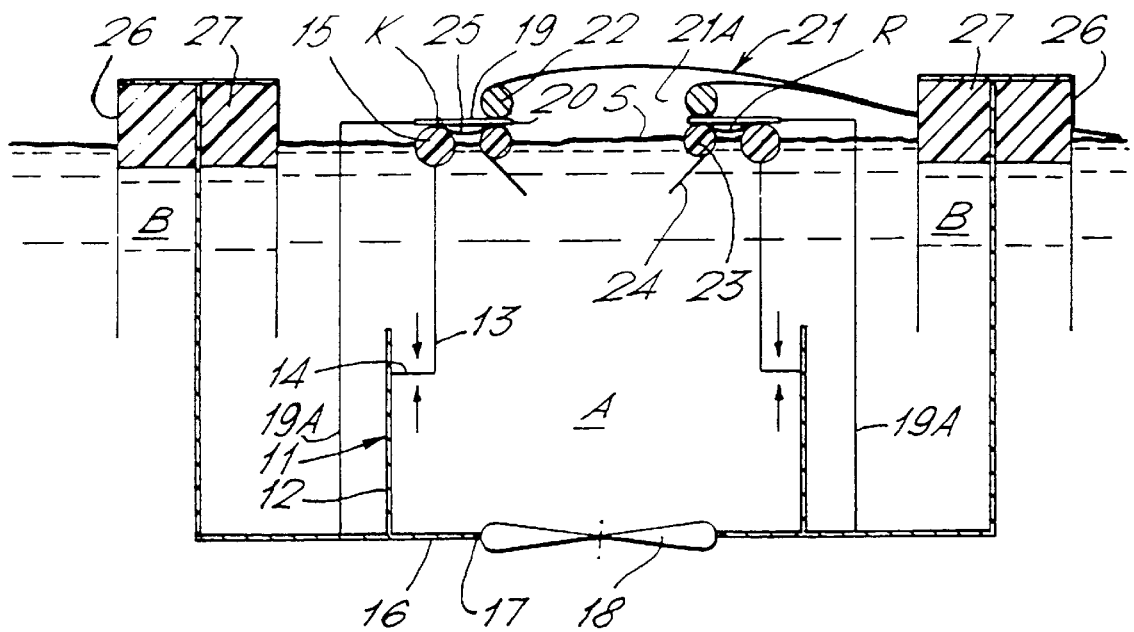
FIGS. 1 to 3 schematically illustrate a skimming apparatus of the invention in different position in a body of water on the surface of which a layer of oil to be recovered floats.
Figure 2:
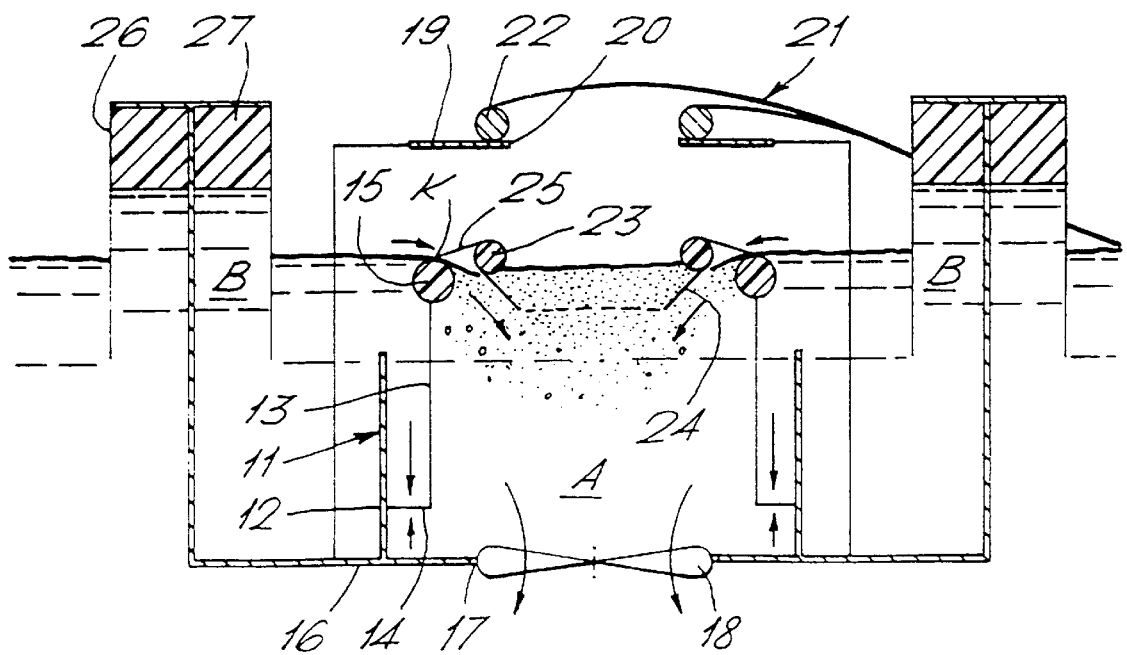

As schematically illustrated in FIGS. 1 and 2, the skimming apparatus according to the invention comprises a collection vessel 11 the side wall of which includes an upright, generally cylindrical lower part 12 and a likewise upright, generally cylindrical upper part 13 which is telescopically movable within the lower part. The lower end of the upper part is provided with an outwardly directed annular flange 14 in sealing engagement with the inside of the lower part 12 and the upper end is provided with an annular buoyancy body 15. A bottom wall 16 of the collection vessel 11 has a central opening 17 through which a pump 18 can pump water into and out of the upwardly open collection compartment A formed by the collection vessel.

Associated with the collection vessel 11 is a horizontal cover plate 19 with a central opening 20. Cover plate 19 is rigidly connected with the lower vessel part 12 through support members 19A indicated by thin lines in FIGS. 1 to 3.

A collection container 21 shown only partially is sealingly connected to the cover plate 19 such that an intake portion 21A of the container is positioned directly above the cover plate opening 20. The collection container 21 may be, for example, a floating tubular "tank" of flexible film or sheet material and in a manner to be described serves to receive oil which is transferred from the collection vessel 11. A sealing ring 22 positioned around the opening 20 provides a seal between the collection container 21 and the cover plate 19.

Figure 3:
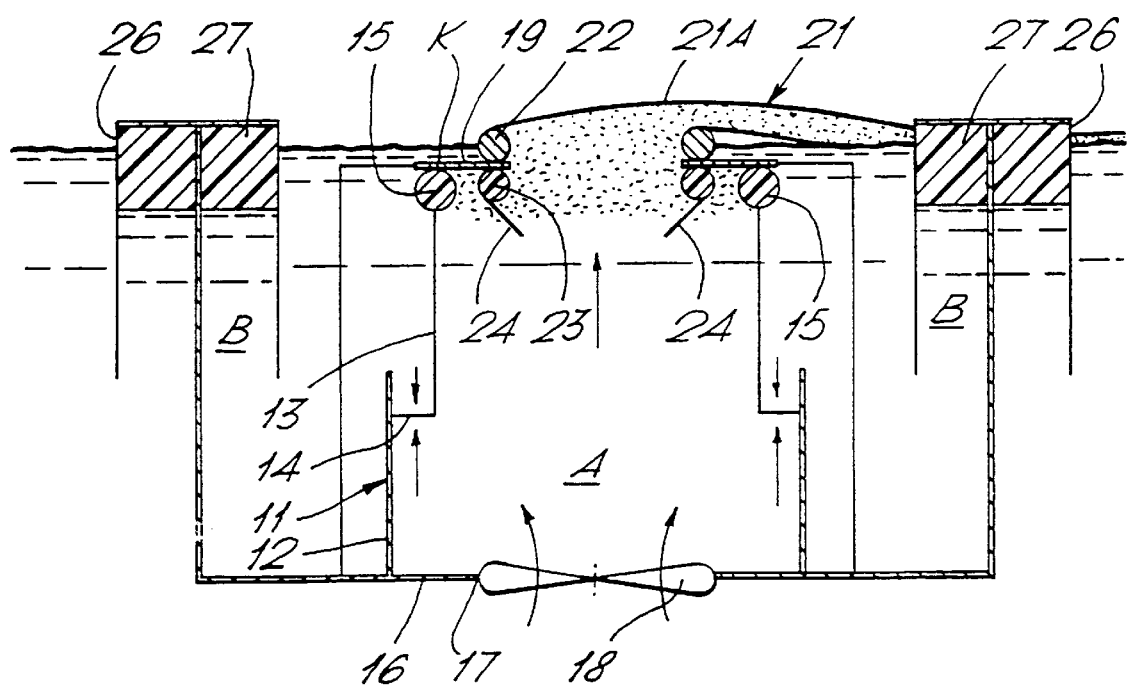

Also associated with the collection vessel 11 is a second annular buoyancy body 23 which is positioned within and substantially concentrically with the first-mentioned buoyancy body 15 and which has a depending annular skirt 24. As illustrated in FIGS. 1 to 3, this skirt 24, which may possess some resiliency, is frusto-conical with the small end directed downwardly, but it may have other shapes.

The second buoyancy body 23 is attached to the first buoyancy body 15 by means of a number of radial straps or other flexible connecting members 25 such that it is substantially freely movable up and down relative to the first buoyancy body 15. Liquid can pass through the annular gap R between the two buoyancy bodies 15 and 23 without being substantially obstructed by the connecting members 25 because these only cover a small portion of the gap.

In addition to the above-described collection vessel 11 with associated components the skimming apparatus comprises a number of, three, for example, buoyancy bodies, hereinafter termed stabiliser bodies and designated 26, which are spaced outwardly from the collection vessel 11 and rigidly connected with the lower part 12 of the collection vessel. These stabiliser bodies 26 have a buoyancy such that they project above the water surface in the equilibrium position shown in FIG. 1, in which the collection vessel 11 is substantially completely filled with water. In plan view there is a passage between the stabiliser bodies 26 along which unobstructed flow is possible from the body of water surrounding the apparatus into the top portion of the collection compartment A.

Each stabiliser body 26 is in the shape of a cylindrical cup turned upside down, the uppermost portion of which is closed and contains a buoyancy block 27 of a light-weight material, such as expanded plastic, while the lower, immersed end is open. The stabiliser bodies are arranged such that the space B beneath the buoyancy body 27 will be filled with water when the skimming apparatus is set into the water. A nonreturn valve (not shown in the drawings) in the stabiliser body facilitates filling of that space with water by opening to allow air trapped therein to escape but closes when a subatmospheric pressure tends to develop.

When he skimming apparatus is to be used for recovering oil it is set into the body of water from which oil is to be recovered. In FIG. 1 the apparatus is shown in an inactive condition, namely in a position in which the collection vessel 11 has been filled with water through the bottom wall opening 17 and in which the buoyancy body 15 on the upper part 13 of the collection vessel sealingly engages the cover plate 19.

In this position the pump 18 is started to pump water downwardly from the collection vessel 11 through the opening 17. The downward discharge of water lowers the water level in the collection vessel 11 so that a water sink is formed inwardly of the buoyancy body 15. Accordingly, a difference in water levels inside and outside the buoyancy body 15 will be created.

The difference thus created in the levels of the liquid in the collection vessel 11 and the body of water surrounding the collection vessel will influence the upper part 13 of the collection vessel in two respects.

Firstly, the buoyant force tending to lift the buoyancy body 15 is slightly reduced, because the liquid volume displaced by the buoyancy body is reduced in proportion to the difference in levels; the portion of the buoyant force resulting from the partial immersion of the buoyancy body in the liquid in the collection vessel is reduced as a consequence of the lowering of the liquid level in the collection vessel.

Secondly, the head or hydrostatic pressure acting on the upper side of the flange 14 of the upper collection vessel part 13 will become greater than the head or hydrostatic pressure acting on the lower side. Accordingly, the flange 14 and thereby the entire upper vessel part 13 will be subjected to a downwardly directed resultant force.

As a consequence, the upper part 13 of the collection vessel 11 will be displaced downwardly relative to the lower part 12. Although the buoyant force acting on the portion of the buoyancy body 15 which dips into the body of water outside the upper collection vessel part 13 will increase slightly, the buoyancy body 15 will, when a certain difference in levels has been reached, take a completely immersed position below the surface of the body of water so that the oil-water surface layer of the body of water will flow into the collection vessel 11 over the crest K of the skimming weir formed by the buoyancy body 15.

The liquid, oil and water, which overflows the buoyancy body 15 will be deflected downwardly in the collection compartment A by the inner second buoyancy body 23 and its skirt 24. Because the cross-sectional area of the flow passage increases downwardly, the velocity of the downwardly flowing liquid will decrease rapidly, thereby allowing the lighter oil to pass beneath the lower edge of the skirt 24 and collect on the surface of the space S defined within the buoyancy body 23 and its skirt 24. This is shown in FIG. 2. Naturally, oil can also collect in the annular space R between the buoyancy bodies 15 and 23.

The space S inwardly of the buoyancy body 23 and its skirt 24 constitutes a calming or stabilising zone in which the oil can form a coherent layer without disturbance caused by the liquid flowing radially inwardly over the buoyancy body 15.

The pumping out of water from the lower end of the collection vessel 11 and the resulting reduction of the volume of water therein results in a reduction of the total weight of the water-filled skimming apparatus. As a consequence, the stabilising bodies 26 will tend to lift the entire skimming apparatus to a slightly higher level. However, this lifting is counteracted as a consequence of the fact that the water volumes accommodated in the lower portions B of the stabilising bodies 26 will remain coupled to these bodies and thus will also be lifted and therefore act as extra weights adding to the total weight of the skimming apparatus.

The interplay between the forces which thus act, on the one hand, on the upper vessel part 13, which is easily movable in the vertical direction with respect to the lower part 12 and the elements rigidly connected therewith, and, on the other hand, on the skimming apparatus in its entirety, provides a sensitive and quick self-regulation of the elevation of the buoyancy body 15 and thus the crest K of the skimming weir, resulting in a rapid matching of the liquid inflow into the collection vessel to the outflow therefrom. If in a given moment the inflow into the collection vessel should be too rapid in relation to the outflow, the difference in levels (or, more precisely, the hydrostatic pressure differential) between the liquid in the collection vessel and the surrounding body of liquid will be reduced so that the buoyancy body 15 is lifted and reduces the inflow. If instead the outflow is too rapid in relation to the inflow, the buoyancy body 15 will become deeper immersed to increase the inflow.

As a consequence of the free vertical movability of the easily movable upper vessel part 13 with the skimming weir formed by the buoyancy body 15 relative to the sluggishly movable remaining part of the skimming apparatus, including the water volumes accommodated in the collection vessel 11 and the stabilising bodies 26 the elevation of the crest K of the skimming weir is very sensitively self-regulated in dependence on level changes of the surrounding body of water and of the liquid level in the collection vessel.

After the apparatus has been operating for a shorter or longer time to collect oil in the collection compartment, the pump 18 is reversed to pump water from below into the collection vessel 11. The rising level of liquid in the collection vessel will then cause the buoyancy bodies 15 and 23 to engage the underside of the cover plate 19. The first buoyancy body 15 will serve as a shut-off valve between the interior of the collection vessel 11 and the surrounding body of liquid. Because of the increased water volume in the collection vessel the entire skimming apparatus will initially move downwardly in the body of water, but continued downward movement will be counteracted by the increasing buoyant force on the stabilising bodies 26 resulting from their downward movement. The uppermost liquid layer in the collection vessel, that is, the layer of oil in the space S within the second buoyancy body 23 and its skirt 24 will be forced through the cover plate opening 20 and through the container intake portion 21A and the associated sealing ring 22 into the collection container 21 floating on the surrounding body of water. This is shown in FIG. 3.

Expulsion of the light top liquid layer into the collection container 21 by introduction of a displacing heavier liquid from below into the collection compartment A can take place in a single continuous step. However, the expulsion can also take place intermittently in one or more successive steps by temporary interruption of the introduction of the displacing liquid. During the interruptions or idle periods, when no substantial flow into or out of the collection compartment A takes place, oil droplets or oil lumps can smoothly migrate to the surface in the space S.

Following completion of the transfer of the oil to the collection container 21 the pump 18 may again be reversed so that the above-described operation can be repeated. The cover plate 19 and, accordingly, the intake portion 21A of the collection container 21 will resume the elevated position shown in FIG. 2 so that reverse flow of the contents in the collection container through the cover plate opening 20 is avoided.

Reverse flow of oil from the collection container 21 into the collection vessel can be prevented by suitable valve means associated with the container.

Switching from the accumulation of oil in the collection vessel 11 as shown in FIG. 2 to the transfer of the accumulated oil to the collection container 21 as shown in FIG. 3 and also switching back to the accumulation mode can take place in different ways and using different means. For example, the height or thickness of the accumulated layer of oil can be ascertained by monitoring the power consumption of the motor driving the pump 18, and the switching to the transfer mode can take place automatically in response to the detection of a given height of the layer. Switching back to the accumulation mode as shown in FIG. 2 can also take place automatically in dependence of the power consumption of the pump motor.

FIGS. 1 to 3 are primarily intended to illustrate the principles of the method and the apparatus according to the invention, rather than to show a preferred embodiment of the invention. It should be noted, however, that it is possible within the scope of the invention to depart from what is shown in FIGS. 1 to 3. For example, the transfer of the oil (or the floating pollutant or other matter to be recovered) from the collection vessel can take place more or less continuously using a separate pump apparatus the intake of which is positioned in the layer of accumulated oil. Moreover, the collection vessel 11, which is variable in respect of its height and hence in respect of its volumetric capacity, need not necessarily be cylindrical or comprise two separate parts as shown in FIGS. 1 to 3.

Figure 1A:
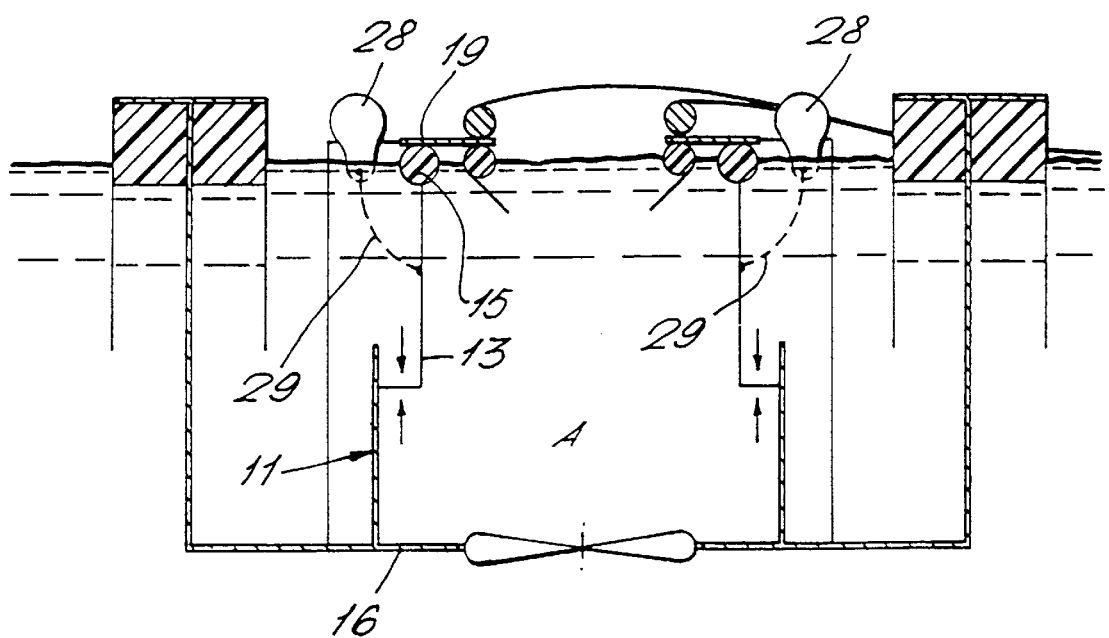
FIGS. 1A and 2A are views similar to FIGS. 1 and 2, respectively, showing a modification of the skimming apparatus.
Figure 2A:
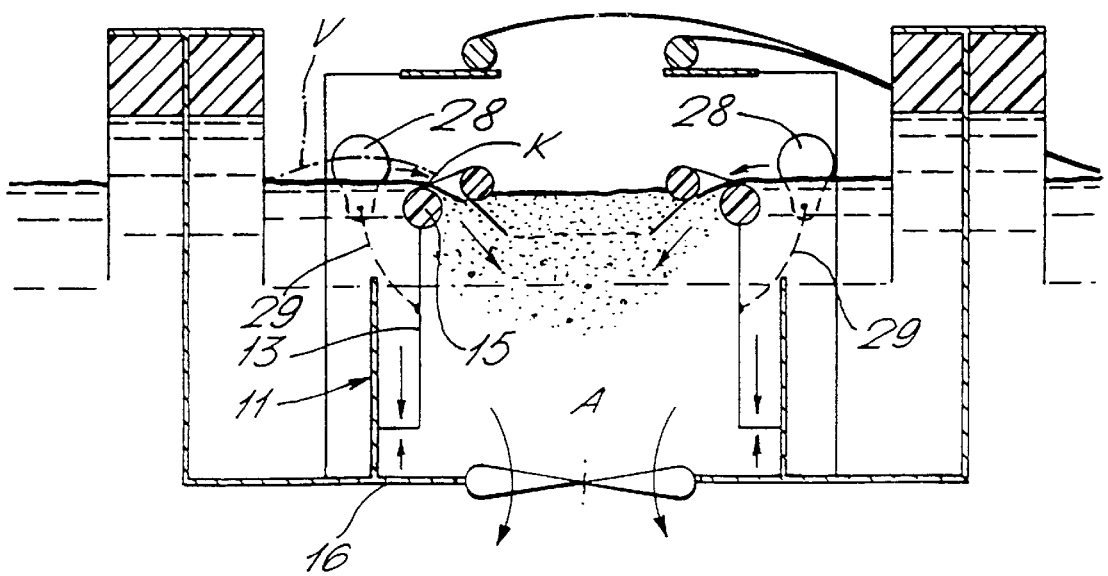

FIGS. 1A and 2A show additional buoyancy bodies 28 which are provided at spaced-apart locations around and radially outwardly of the first buoyancy body 15.

These additional buoyancy bodies 28, which are spaced-apart sufficiently to obstruct the radial inflow into the collection vessel 11 from the surrounding body of liquid only minimally, are attached to the upper collection vessel part 12 (or direct to the buoyancy body 15) by cables or other suitable means as indicated in broken lines at 29 in FIG. 1A.

The attachment of the buoyancy bodies 28 and their shape are chosen such that during normal operation, as can be expected when the water surface is fairly smooth, the additional buoyancy bodies dip into the water only slightly or not at all so that they do not apply any significant upward force to the upper collection vessel part.

In other words, during normal operation of the skimming apparatus, the additional buyoancy bodies 28 have no significant influence on the elevation of the crest K of the skimming weir.

However, if a sudden increase of the level of the water surface should occur near the collection vessel 11, for example when a wave reaches the skimming apparatus, the attachment cables or means 29 will prevent the additional buoyancy bodies 28 from moving upwardly relative to the upper collection vessel part 12. Consequently, the additional buoyancy bodies 28 will apply an additional upward force to the upper collection vessel part to cause the buoyancy body 15 to engage the cover plate 19 and prevent an excessive inflow of liquid into the collection vessel 11.

Preferably, the additional buoyancy bodies 28 are interconnected by a cable or other suitable linking means extending around the collection vessel, suitably such that they can move vertically relative to one another but are kept suitably spaced-apart circumferentially and in a suitable proximity to the skimming weir crest K.

Figure 6:
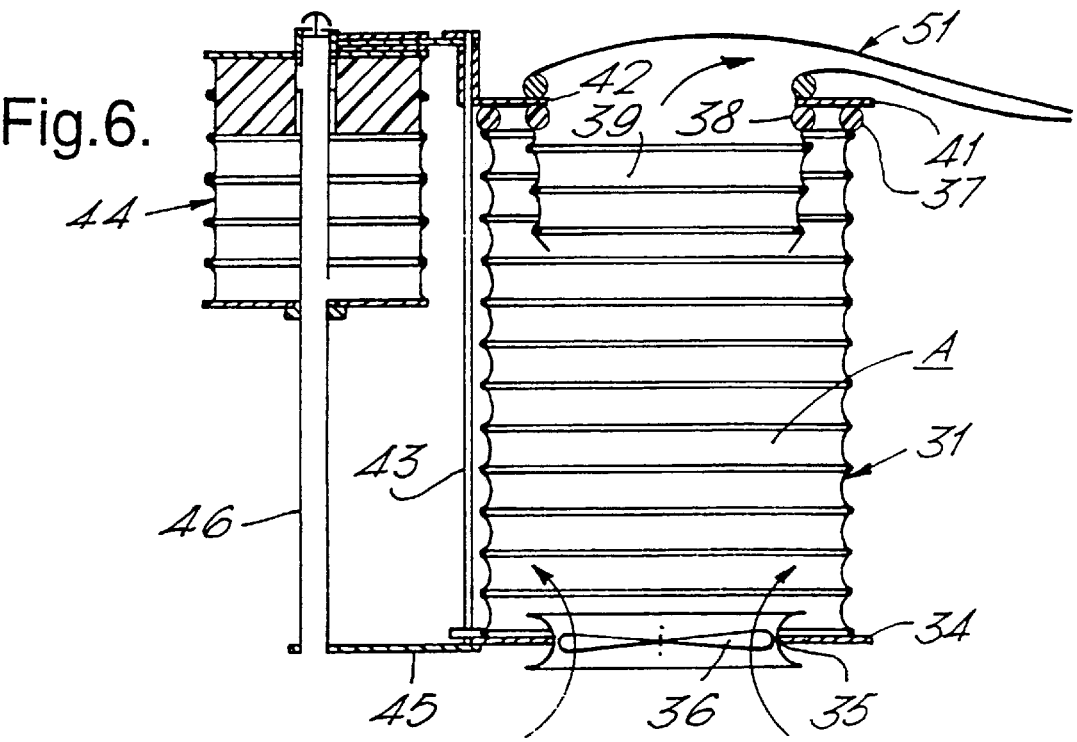
Figure 7:
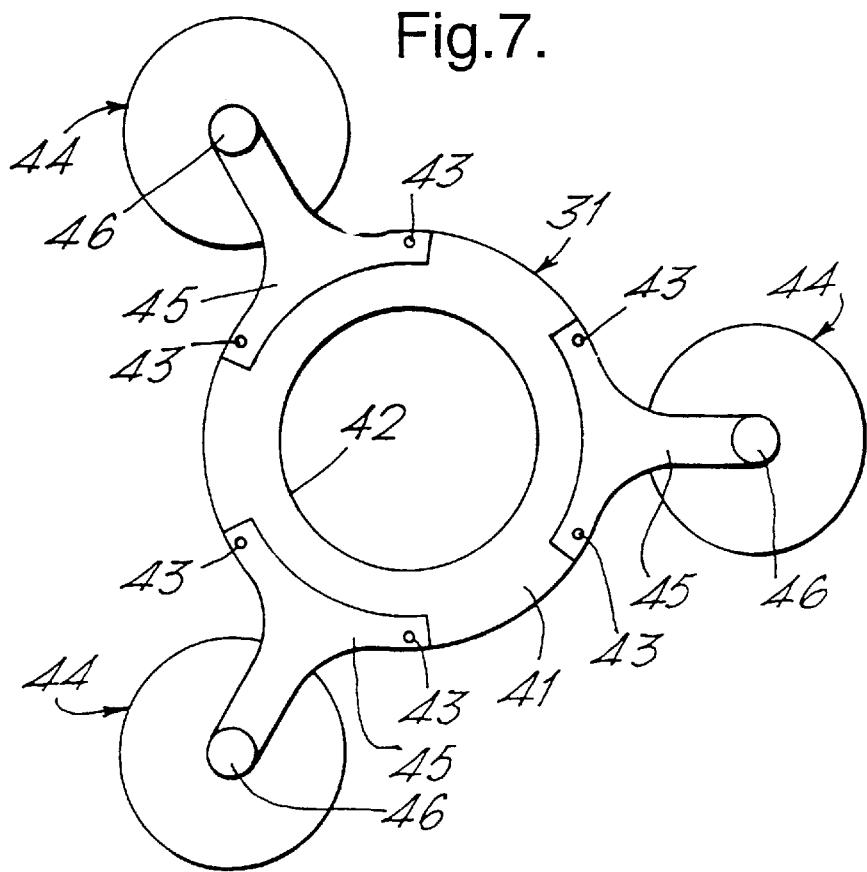

FIGS. 4 to 7 schematically show an example of an embodiment of the skimming apparatus according to the invention, FIGS. 4 to 6 showing the apparatus in operating positions corresponding to those shown in FIGS. 1 to 3 while FIG. 7 is a plan view of the apparatus.

As regards its principal features, the apparatus shown in FIGS. 4 to 7 generally corresponds to the apparatus of FIGS. 1 to 3, both in respect of the basic structure and in respect of the basic operation.

In the embodiment of FIGS. 4 to 7, the collection vessel 31 defining the collection compartment A is a structure which is collapsible vertically in accordion fashion. Its side wall 32 is made from a flexible but substantially unextendable film or sheet material wrapped around a number of rigid spaced circular rings 33 of plastic or light alloy. In the extended condition as shown in the figures, these rings are spaced apart but when the apparatus is disassembled they can be positioned close to one another or even in a common plane. The lowermost ring 33 is secured to a bottom plate 34 having an opening 35 in which a pump 36 is positioned. On the uppermost ring 33 an annular buoyancy body 37 is mounted which forms the skimming weir and its crest K and corresponds to the first buoyancy body 15 of the apparatus shown in FIGS. 1 to 3.

Inside the upper portion of the collection vessel 31, and positioned substantially concentrically with the collection vessel and with the buoyancy body 37, is a second annular buoyancy body 38 with a depending skirt 39 corresponding respectively to the buoyancy body 23 and the skirt 24 in FIGS. 1 to 3. Like the collection vessel 31 the skirt 39 is a collapsible structure made of a flexible but substantially unextendable film or sheet material wrapped around a number of spaced rigid rings 40. In this embodiment as well the buoyancy body 38 is attached to the buoyancy body 37 or the uppermost ring 33 by straps or the like such that it can move freely up and down relative to the buoyancy body 37 but always maintains a substantially concentric position relative to that body. Likewise, the space between the buoyancy bodies 37 and 38 and the space inside the buoyancy body 38 and its skirt 39 are designated respectively R and S.

As in FIGS. 1 to 3 a cover plate 41 with an opening 42 is arranged in a stationary position relative to the bottom plate 34. More particularly, the bottom plate 34 and the cover plate 41 are releasably secured to opposite ends of six circumferentially uniformly spaced-apart vertical tubes 43. Inside the ring of tubes the buoyancy body 37 and the upper portion of the side wall 32 of the collection vessel 31, and thus also the buoyancy body 38 and the skirt 39, can move up and down.

Pairs of the tubes 43 support three stabilising bodies 44 (correspond to the stabilising bodies 26 in FIGS. 1 to 3) through the intermediary of three pairs of radially outwardly extending upper and lower brackets 45. As best shown in FIG. 7, the stabilising bodies are uniformly spaced-apart circumferentially around the collection vessel 31 and spaced radially outwardly therefrom. Each stabiliser body 44 is arranged about the upper portion of the associated tube 46.

Like the collection vessel 31 each stabiliser body 44 constitutes a vertically collapsible structure having a side wall 47 made from a film or sheet material wrapped around spaced-apart circular rigid rings 48. The uppermost portion of the space defined by the side wall 47 is occupied by a buoyancy block 49 of expanded plastic, for example, while the portion of that space which is below the buoyancy block 49 is open and intended to be filled with water during operation of the skimming apparatus. To hold the side wall tautly extended the lowermost ring 48 is releasably secured to the tube 46.

A nonreturn valve 50 is provided at the upper end of each tube 46 and arranged to open to permit air in the space below the buoyancy block 49 to escape upwardly when this space is to be filled with water but to close when a subatmospheric pressure is developed so that escape of water is prevented. The filling with water and the venting can take place through the tube as is indicated by arrows in FIG. 4. As in the embodiment of FIGS. 1 to 3 a collection container 51 is sealingly connected to the cover plate 41 such that an intake portion 51A of the container is directly above the opening 42, which is surrounded by a sealing ring 52 of the container.

The apparatus shown in FIGS. 4 to 7 operates essentially in the manner described above with reference to FIGS. 1 to 3. However, a certain difference is to be seen in the fact that with the illustrated cylindrical shape of the collection vessel 31 there is no differential pressure surface corresponding to that which is provided by the opposite thrust surfaces of the flange 14 in FIGS. 1 to 3. Instead, a downward pulling force acting on the buoyancy body 37 will be produced because the pressure differential across the flexible side wall 32 of the collection vessel will deform the side wall inwardly and thereby draw the rings 33 toward one another so that the entire collection vessel will be contracted vertically. If desired, however, a differential pressure surface may be provided by making the collection vessel 11 narrower at the upper portion than at the lower portion.

As is evident from FIGS. 4 to 7 the skimming apparatus according to the invention can be made as a very lightweight, quickly assembled and disassembled and easily transported construction. Moreover, it can be produced at low cost. It is economically realistic, therefore, to produce the apparatus in large numbers and station them at sites from which they can be quickly transported to every foreseeable place of operation where they can quickly be prepared for operation.

Because of the omnidirectional inflow into the collection vessel and the rapid separation of the lighter material in the collection vessel a high collection capacity is possible.

In the above-described embodiments of the skimming apparatus the elevation of the skimming weir crest K is self-regulated substantially under the action of three different forces, namely gravity force or weight, a hydrostatic buoyant force and a hydrostatic thrust force.

The gravity force on the upper part of the collection vessel, which is vertically movable independently of the rest of the collection vessel and the volume of liquid held therein, constantly tends to move the upper part and thus the skimming weir crest downwardly. On the other hand, the buoyant force acting on the upper collection vessel part tends to move that part and thus the skimming weir crest K upwardly.

The buoyant force is composed of two vertical components, namely a component produced by the liquid in the collection vessel and a component produced by the liquid in the surrounding body of water.

In the condition shown in FIGS. 1 and 4, in which at every level the hydrostatic or head pressure within the collection vessel is the same as that in the surrounding body of water, the sum of the two buoyant force components equals the gravity force plus, if applicable, the force under which the buoyant body 15 or 23 engages the cover plate.

When the hydrostatic pressure in the collection vessel is less than the hydrostatic pressure in the surrounding body of water, the third force, in the form of a downwardly directed force determined by the pressure differential, also exerts an influence.

In the embodiment of FIGS. 1 to 3 this third force acts through the intermediary of the flange 14. In the embodiment of FIGS. 4 to 7, this force is provided by the side wall 33 of the collection vessel 31 as it is being pressed inwardly between the rings 33 and thereby contracted horizontally so that the entire collection vessel is contracted vertically.

However, it is within the scope of the invention to produce a similar self-regulation in other ways. For example, the last-mentioned force, i.e. the third force, may be dispensed with by omitting the differential thrust surface so that only a buoyant force proportional to the pressure differential between the collection vessel and the surrounding body of water exerts an influence.

A further possibility is to replace the buoyant force, or combine it with, a force which constantly acts on the upper part of the collection vessel and thus on the skimming weir crest K, such as a spring force. Still another possibility is to apply a constantly acting downwardly directed force, i.e. a force which coacts with the gravity force.

Other, purely structural modifications are also possible within the scope of the invention. The illustrated annular shape of the skimming weir crest and the deflecting member situated inwardly of the skimming weir and constituted by the buoyant body 23 or 38 with the skirt 24 and 39 is very advantageous but not necessary. Accordingly, it is possible to allow the inflow into the collection compartment to take place across a skimming weir crest K which does not extend along the entire periphery of the collection vessel but only along a portion thereof (though preferably along the major portion). The deflecting member can then be limited to a corresponding portion of the circumference.

In a further embodiment, which is not shown in the drawings, the skimming apparatus is designed to be moved in a predetermined direction relative to the body of water during the collection of the surface layer. For example, the apparatus may be towed or moved by an integrated propulsion unit, or the body of water can be a flowing body of water in which the skimming apparatus is held in a stationary position. If the skimming apparatus is provided with an integrated propulsion unit, this unit can also be used for pumping water out of, and possibly also into, the collection vessel.

In the further embodiment the buoyancy body forming the skimming weir extends only over a portion of the circumference of the collection vessel, namely over from 50 to 75% of the circumference. During the collection of oil or other surface layer to be collected, the skimming weir is on the upstream side, so that it is directed in the direction of movement of the skimming apparatus relative to the flowing body of water, and the collected material is discharged into a collection container in the opposite or downstream direction through a horizontal outlet provided at the portion of the circumference of the collection vessel which is not subtended by the skimming weir.

What is claimed is:

1. A method for skimming a floatable surface layer having a buoyant pollutant from a body of water, the method comprising the steps of:

disposing in the body of water a collection vessel having a collection compartment and a skimming weir which forms an upper part of the collection vessel and delimits the collection compartment upwardly, the skimming weir moves vertically relative to an underlying part of the collection vessel, filling the collection compartment with water, causing the skimming weir to take an overflow position relative to the surface layer to allow the surface layer to flow over the skimming weir into the collection compartment by forming and maintaining a water sink in the collection compartment, controlling the overflow position of the skimming weir by applying to the skimming weir a vertical force having a magnitude of which varies in proportion to a difference in head pressure between the collection compartment and the body of water surrounding the collection vessel, and discharging a supernatant layer of the surface layer in the collection compartment by displacing an amount of water taken from the body of water surrounding the collection vessel and introducing the amount into a lower portion of the collection compartment through a discharge opening which communicates with the collection compartment.

2. The method according to claim 1, wherein the vertical force comprises a buoyant force.

3. The method according to claim 2, wherein the buoyant force is composed of two components having a same direction, one of the components is determined by a displaced volume of liquid in the collection compartment and the other component is determined by a displaced volume of liquid in the body of water surrounding the collection vessel.

4. The method according to claim 1, wherein the vertical force comprises a force which is the resultant of two oppositely directed hydrostatic forces acting on a force-generating member having a force-transmitting connection with the skimming weir, one of the oppositely directed hydrostatic forces is determined by a surface provided on the force-generating member and located in the collection compartment, the other oppositely directed hydrostatic force is determined by a thrust surface provided on the force-generating member and disposed in the body of water surrounding the collection vessel.

5. The method according to claim 1, wherein the skimming weir is sealingly engaged to an overlying cover of the collection vessel when the supernatant layer is discharged.

6. The method according to claim 1, further comprising controlling an elevation of the underlying part of the collection vessel in the body of water by connecting a plurality of buoyancy bodies to the underlying part and positioning the plurality of buoyancy bodies in the body of water surrounding the collection vessel.

7. The method according to claim 6, further comprising controlling the elevation of the underlying part by increasing a weight of the plurality of buoyancy bodies when the elevation of the underlying part is increased, the weight is increased by coupling a volume of water delimited from the body of water to the plurality of buoyancy bodies when the bodies move in the body of water.

8. The method according to claim 1, wherein the surface layer flowing over the skimming weir is deflected downwardly into the collection vessel by a flow barrier extending downwardly into the collection compartment.

9. An apparatus for skimming a floatable surface layer having a buoyant pollutant from a body of water, the apparatus comprising:

a collection vessel including a collection compartment having a lower part and an upper part and being immersible in a body of water, a skimming weir that forms an inlet into the upper part of the collection compartment, the skimming weir moves vertically relative to the lower part of the collection vessel, the skimming weir moves to an overflow position in the body of water when water is discharged from the collection compartment to the surrounding body of water for allowing the surface layer to flow over the skimming weir into the collection compartment, the overflow position is controlled by a difference in a head pressure between an interior of the collection compartment and an exterior side of the collection vessel, a cover overlying the collection compartment and having a discharge opening wherein a supernatant layer of the surface layer is discharged through the discharge opening by feeding water from the surrounding body of water into the collection compartment and the skimming weir sealingly engages the cover to close the collection compartment upwardly.

10. The apparatus according to claim 9, wherein the cover is mounted on the collection vessel.

11. The apparatus according to claim 9, wherein the skimming weir comprises a first buoyancy body at least a portion of which is adapted to displace an amount of liquid in the collection compartment.

12. The apparatus according to claim 11, wherein the first buoyancy body is adapted to displace an amount of liquid both in the collection compartment and in a body of water surrounding the collection vessel.

13. The apparatus according to claim 9, wherein the upper part of the collection vessel along with the skimming weir moves vertically relative to the lower part.

14. The apparatus according to claim 9, further comprising a force-generating member connected to the skimming weir, the force-generating member includes two oppositely facing thrust surfaces, one of which is located inside the collection vessel and the other of which is located on the exterior side of the collection vessel.

15. The apparatus according to claim 9, wherein the collection vessel comprises a side wall, the side wall is flexible over at least a portion of a height of the collection vessel, the collection vessel collapses vertically by radial contraction of the side wall due to a difference in water pressure over the thrust surfaces.

16. The apparatus according to claim 15, wherein the collection vessel vertically collapses in an accordion fashion.

17. The apparatus according to claim 9, further comprising a deflecting member in the collection compartment for downward deflection of an amount of liquid flowing over the skimming weir from the surrounding body of water into the collection compartment.

18. The apparatus according to claim 17, wherein the deflecting member is supported by a second buoyancy body, the second buoyancy body is supported by an amount of liquid in the collection compartment when the second buoyancy body moves vertically and independently of the skimming weir.

19. The apparatus according to claim 18, wherein the second buoyancy body delimits a peripheral inflow zone between the skimming weir and a first side of the second buoyancy body and a stabilizing zone on a second side of the second buoyancy body as viewed from the skimming weir.

20. The apparatus according to claim 9, wherein the skimming weir extends along at least a substantial portion of a circumference of the collection vessel.

21. The apparatus according to claim 9, wherein a reversible pump discharges water from the collection compartment into the surrounding body of water and feeds water into the collection compartment.

22. The apparatus according to claim 9, further comprising a plurality of outer buoyancy bodies connected to the lower part of the collection vessel and adapted to support the collection vessel in the body of water, the plurality of outer buoyancy bodies are horizontally spaced from the collection vessel.

23. The apparatus according to claim 22, wherein the plurality of outer buoyancy bodies have a compartment for coupling a volume of water from said body of water.

24. The apparatus according to claim 9, further comprising a plurality of buoyancy members connected to the skimming weir for providing an additional upward buoyant force to support the skimming weir during a sudden rise in a level of the body of water surrounding the collection vessel.

* * * * *